United States Patent
Vongstapanalert (10) Patent No.: US 8,134,477 B2
(45) Date of Patent: Mar. 13, 2012

(54) DOWNHOLE TELEMETRY THROUGH MULTI-CONDUCTOR WIRELINE

(75) Inventor: Winyu Vongstapanalert, Arlington, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 429 days.

(21) Appl. No.: 12/406,236

(22) Filed: Mar. 18, 2009

(65) Prior Publication Data

US 2009/0237267 A1    Sep. 24, 2009

Related U.S. Application Data

(60) Provisional application No. 61/038,130, filed on Mar. 20, 2008.

(51) Int. Cl.
*G01V 3/00* (2006.01)

(52) U.S. Cl. .................................................. 340/854.3

(58) Field of Classification Search ............... 340/853.3, 340/854.3, 854.5, 855.5, 855.7
See application file for complete search history.

(56) References Cited

U.S. PATENT DOCUMENTS

| | | | |
|---|---|---|---|
| 5,747,750 A | 5/1998 | Bailey et al. | |
| 5,917,160 A | 6/1999 | Bailey | |
| 6,464,011 B2 | 10/2002 | Tubel | |
| 6,481,495 B1 | 11/2002 | Evans | |
| 7,026,951 B2 | 4/2006 | Bailey et al. | |
| 7,061,932 B2 | 6/2006 | Gardner et al. | |
| 7,535,795 B2* | 5/2009 | Varsamis et al. | 367/76 |
| 2005/0270172 A1* | 12/2005 | Bailey et al. | 340/854.3 |
| 2007/0188344 A1 | 8/2007 | Hache et al. | |

* cited by examiner

*Primary Examiner* — William P Neuder
(74) *Attorney, Agent, or Firm* — Wong, Cabello, Lutsch, Rutherford & Brucculeri, L.L.P.

(57) ABSTRACT

A logging tool has three seismic sensors that generate seismic signals in response to microseismic events and can be a Tri-axial Borehole Seismic system. The tool also has additional sensors, such as a wireline tension measuring circuit, a gamma ray sensor, an inclinometer, and a gyroscope. The tool deploys downhole with a multi-conductor (i.e., seven conductor) wireline. For the seismic signals, a telemetry unit on the tool derives frequency-modulated carrier signals from the seismic signals, and a transformer of the unit transmits these carrier signals to surface acquisition equipment using cross-wired pairs of conductors in the wireline connected to the transformer's terminals. For the signals from the other sensors, the telemetry unit derives analog carrier signals from their signals and transmits the analog carrier signals to the surface acquisition equipment using remaining conductors of the wireline.

31 Claims, 5 Drawing Sheets

DOWNHOLE TELEMETRY THROUGH MULTI-CONDUCTOR WIRELINE

CROSS-REFERENCE TO RELATED APPLICATIONS

This is a non-provisional of U.S. Patent Application Ser. No. 61/038,130, filed 20 Mar. 2008 and entitled "Improvement in Mapping Sources of Acoustic Energy through Multi-Conductor Wirelines," which is incorporated herein by reference in its entirety and to which priority is claimed.

BACKGROUND

A wireline with multiple internal conductors can be used to transport a logging tool downhole and to transmit data between the tool and surface equipment. The typical wireline has a single insulated inner conductor wrapped by a helix of six insulated conductors. Layers of armor strands wrapped in opposing directions overlay these conductors.

In most instances, each conductor is assigned to a single dedicated analog or digital signal. Unfortunately, the wireline tends to attenuate transmitted signals (consisting of a voltage difference between two terminals) from the wireline's input to its output. The attenuation typically increases with frequency and results from the resistance, capacitance, and inductance of each individual conductor carrying the signal. Also, crosstalk can occur in the conductors through mutual impedance, when a signal transmitted on one set of conductive paths generates a corresponding signal on other paths. Again, the presence of crosstalk also increases with frequency.

Prior art configurations have been developed to make multi-conductor wirelines more useful in carrying a greater number of data signals and to increase the maximum frequency bandwidth of these signals. Such prior art configurations have been designed for Triaxial Borehole Seismic (TABS) downhole logging system used in microseismic hydraulic fracture mapping. An example of such as system is disclosed in U.S. Pat. No. 5,747,750 to Bailey et al., which is incorporated herein by reference in its entirety. With the TABS system deployed downhole, operators inject frac fluids at fracturing rates into the formation, and the TABS system records microseismic acoustic data emitted by the formation in response to the hydraulic fracture stimulations. The TABS tool then transmits the microseismicity through the wireline to the surface where it can then be interpreted to provide a three-dimensional mapping of the fracture network.

Yet, problems with attenuation and cross-talk, especially at higher frequencies, can still limit the available bandwidth for the signals transmitted uphole with the above system. Therefore, a downhole telemetry configuration disclosed in U.S. Pat. No. 7,026,951 to Bailey et al., which is incorporated herein by reference in its entirety, has been developed to handle such problems. The configuration reproduced in FIG. 1 includes a wireline 10 having seven conductors (1-7). One end of the wireline 10 couples to a transformer 20 for the telemetry input of a downhole TABS tool (not shown), while another end of the wireline 10 couples to a transformer 30 for the telemetry output to a data acquisition system (not shown). One terminal 22a/32a of each transformer 20/30 connects to cross-wise or opposing pairs of conductors (1 & 4), while the other terminals 22b/32b connect to cross-wise pair of conductors (2 & 5). Connecting the conductors in these cross-wise pairs improves the frequency response of the telemetry configuration.

Figure 1:
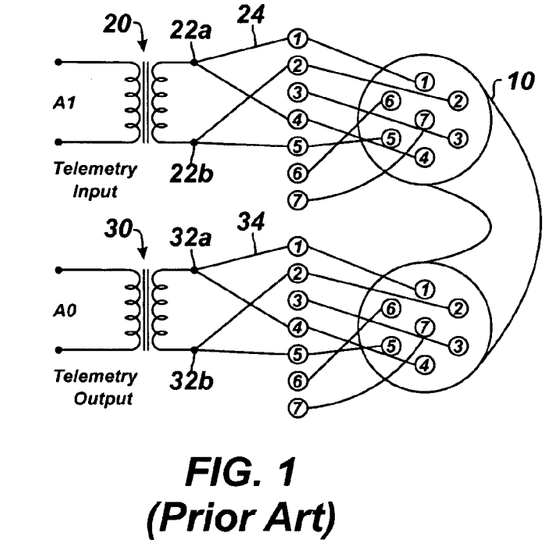
FIG. 1 illustrates a prior art data telemetry configuration for a Triaxial Borehole Seismic (TABS) logging system.

The configuration in FIG. 1 is operated using a frequency modulated telemetry scheme. In this scheme, geophones of the TABS tool generate data signals, and the downhole telemetry unit digitizes the data signals and modulates the digitized signals into frequency modulated (FM) signals. Then, the downhole telemetry unit transmits the FM signals uphole via the multi-conductor wireline 10. At the surface, the data acquisition system coupled to the wireline 10 receives the FM signals and demodulates them so they can be processed to determine the microseismic acoustic data.

Although the configuration of FIG. 1 operated using a frequency-modulated telemetry scheme is effective, operators are continually seeking increased functionality when performing logging operations.

SUMMARY

A downhole data telemetry apparatus and method uses conductors of a multi-conductor wireline to transmit both frequency-modulated (FM) carrier signals and analog carrier signals from a downhole logging tool to a surface acquisition system. The logging tool is a Triaxial Borehole Seismic (TABS) logging tool and deploys downwhole with a multi-conductor wireline. Seismic sensors (e.g., geophones) on the downhole tool generate (i.e., receive and process) seismic signals in response to microseismic events. At the same time, one or more additional sensors generate signals during operation. These additional sensors can include a tension circuit, a gamma ray detector, an inclinometer, and a gyroscope.

An electronic unit in the logging tool derives FM carrier signals from the seismic signals from the geophones by digitizing these signals and modulating the digitized signals. In addition to the seismic signals, the tool also derives FM carrier signals for the signals generated by at least one of the second sensors, including preferably the tension circuit and/or the gamma ray detector. Both the geophones' and second sensors' FM carrier signals are then transmitted from a first telemetry output to a surface acquisition system via first wireline conductors, which preferably includes at least one cross-wise pair of conductors and either another conductor or another crosswise pair.

At the same time, the tool derives analog carrier signals from the signals generated by the other sensors (e.g., tension circuit, gamma ray detector, inclinometer, and gyroscope). These analog carrier signals are then transmitted to the surface acquisition system via second wireline conductors, which are the remaining conductors not used for FM carrier signals. These analog carrier signals can be handled using a conventional data acquisition system that does not need to handle FM carrier signals.

The foregoing summary is not intended to summarize each potential embodiment or every aspect of the present disclosure.

DETAILED DESCRIPTION

Figure 2:
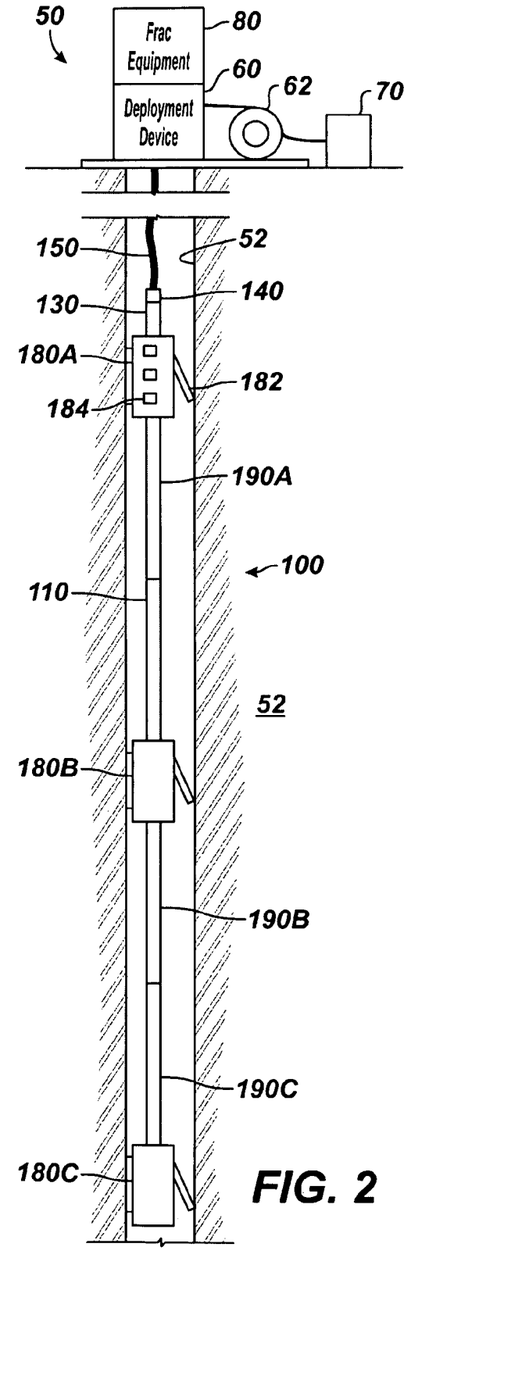
FIG. 2 illustrates a Triaxial Borehole Seismic (TABS) logging system according to the present disclosure.

FIG. 2 shows a Triaxial Borehole Seismic (TABS) logging system 50 according to the present disclosure. A deployment device 60 uses a multiple-conductor, armored wireline 150 to deploy a TABS logging tool 100 in a borehole 52. Downhole, a cable head 130 connects the wireline 150 to the logging tool 100, while the wireline 150 connects to acquisition equipment 70 at the surface. This surface equipment 70 can use one or more data acquisition systems as noted below. Also at the surface, fracing equipment 80 is used to inject frac fluid into the borehole 52 during operations discussed below.

In general, the TABS logging tool 100 has a rigid tool body that can be about 72-ft long, for example. Three seismic sensors 180A-C (e.g., geophones) are disposed on the tool body and are separated by about 32-ft from one another, although other distances are possible. Each of the three geophones 180A-C has a clamp-arm 182 that is driven by a motor and wedges the geophone 180A-C in the borehole 52. Inside, each geophone 180A-C also has a set of transducers (i.e., accelerometers) 184 that measure acceleration in three orthogonal axes. In some instances, the geophones 180A-C may have three or five accelerometers.

In addition to the geophones 180A-C, the tool 100 also has one or more additional sensors, including, but not limited to, a tension circuit 140, a gamma ray detector 190A, an inclinometer unit 190B, and a gyroscope 190C. The tool 100 can also include downhole temperature and pressure gauges as well. A telemetry unit 110 transmits signals from these sensor units 140, 180A-C, 190A-C to the surface acquisition equipment 70 via the wireline 150.

In operation, operators lower the TABS logging tool 100 into the borehole 52 on the bottom end of the wireline 150. The surface end of the wireline 150 connects from a reel 62 to the surface acquisition equipment 70. When the tool 100 reaches the fracture zone, the descent is halted, and the tool 100 is clamped to the borehole 52 using the motor driven clamp-arms 182.

Once the tool 100 is securely in place, the motors are turned off, and the tool 100 is turned on to begin gathering and transmitting data to the surface via the wireline 150. At this point, operators can use the frac equipment 80 to inject fac fluid in the borehole 52 to interact with the formation 54, which will induce mircoseismic events. Typically, the frac fluid has a proppant, such as sand, and is pumped at a high pressure.

After the frac fluids have been injected, the geophones 180A-C on the tool 100 detect the microseismicity of the formation 54. In this process, the transducers 184 inside the geophone 180A-C measure acceleration in three orthogonal axes and detect the microseismic events occurring in the formation 54 from the frac operation. The telemetry unit 110 transmits the seismic data from the geophones 180A-C to the surface acquisition equipment 70 as well as transmitting information about the head voltage, the voltage reference, temperature, and pressure. At the surface, the large quantity of information from the downhole tool 100 can be analyzed and used to characterize the subsurface formation 54.

Figure 3:
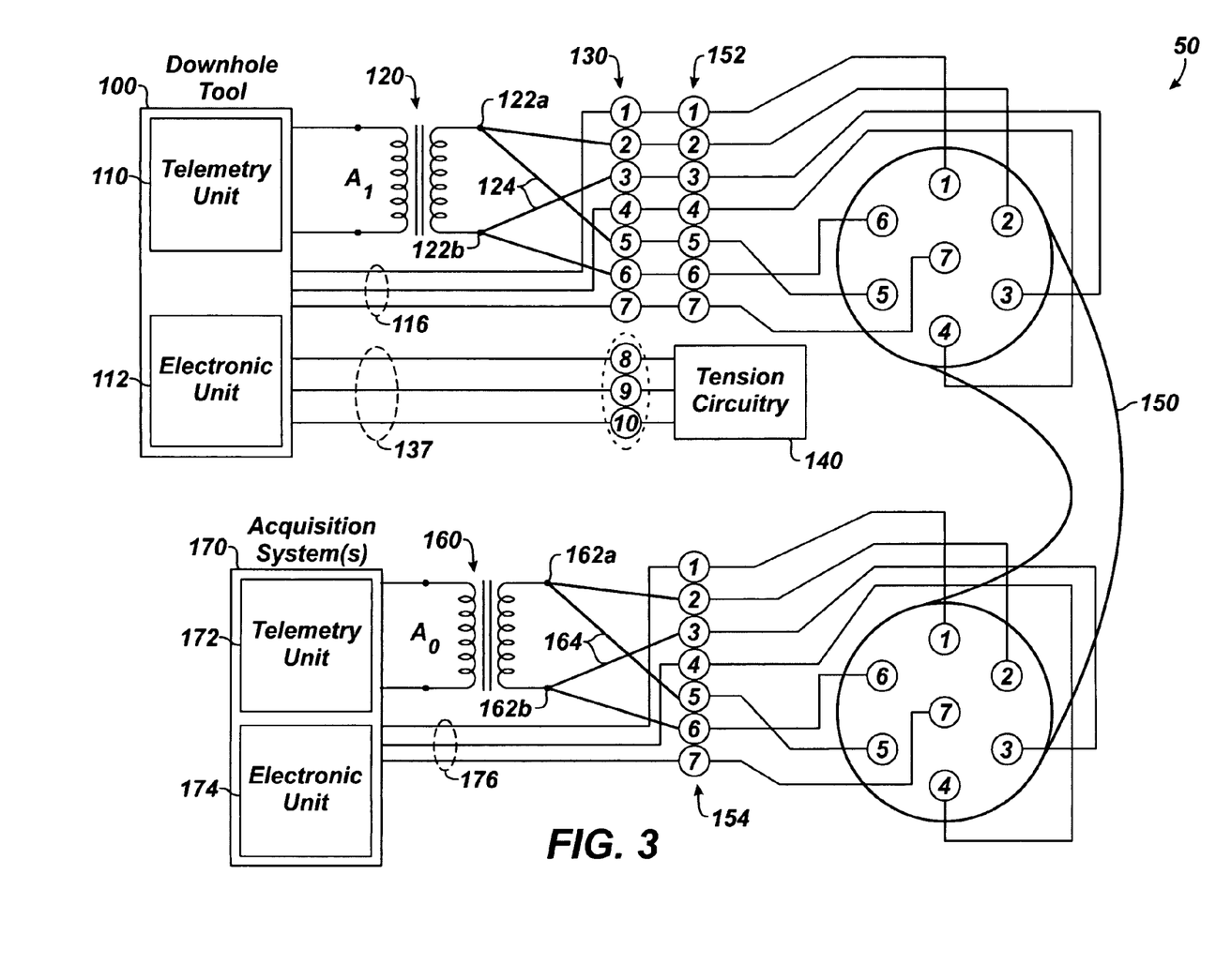
FIG. 3 illustrates a data telemetry configuration for the system of FIG. 2.

Turning to FIG. 3, the telemetry configuration for the system 50 in FIG. 2 is shown in more detail. As shown, the system 100 uses a seven-conductor wireline 150 coupled between the downhole TABS logging tool 100 and a surface acquisition system 170. The wireline's downhole end 152 couples to a cable head 130 and communicatively couples to the downhole tool 100, and the wireline's uphole end 154 communicatively couples to the acquisition system 170.

In addition to the telemetry unit 110, the downhole tool 100 has an electronic unit 112 that communicatively couples to the geophones (180A-C) and the downhole tool's other sensors (e.g., tension circuit, gamma ray, inclinometer, gyroscope, etc.) (190A-C). Performing signal processing functions known in the art of wireline telemetry, the electronic unit 112 derives frequency-modulated carrier signals by digitizing the analog or digital signals generated by the geophones (180A-C) and one or more of the other sensors (140 & 190A-C). Then, the electronic unit 112 modulates the digitized signals into the FM carrier signals for transmission via the wireline 150. To derive analog carrier signals, the electronic unit 112 encodes the analog signals from the second sensors (e.g., tension circuit, gamma ray, inclinometer, gyroscope, etc.) (140 & 190A-C) using amplitude or pulse modulation so the signals can be handled by conventional data acquisition techniques at the surface.

To transmit the carrier signals, the downhole tool 100 uses the telemetry unit 110 communicatively coupled to the electronic unit 112 and the wireline 150. As shown, the telemetry unit 110 has a transformer 120 connected to first conductors (2, 3, 5, 6) of the wireline 150. Additional leads 116 from the telemetry unit 110 connect to second conductors (1, 4, 7). In the current implementation, the telemetry unit 110 transmits the FM carrier signals via the first conductors (2, 3, 5, 6) and transmits the analog carrier signals via the second conductors (1, 4, 7), although other arrangements could be used.

For the FM carrier signals, the transformers 120/160 each have a first terminal 122a/162a connected to a first pair of the first conductors (2, 5) and each have a second terminal 122b/162b connected to a second pair of the first conductors (3, 6). To receive the FM carrier signals, the acquisition system 170 similarly has a telemetry unit 172 and an electronic unit 174. The telemetry unit 172 has a transformer 160 connected to the first wireline conductors (2, 3, 5, 6), and additional leads 176 from the telemetry unit 172 connect to the second wireline conductors (1, 4, 7).

The pairs of first conductors (2, 5) and (3, 6) are cross-wise or opposing pairs. Thus, conductor (2) is located on the opposite side of the center of the wireline 150 from conductor (5) in the first pair, and conductor (3) is similarly opposite conductor (6) in the second pair so that each conductor wire is tied to an opposing wire. As an alternative, one terminal (e.g., 122a/162a) can connect to a pair of conductors, while the other terminal (e.g., 122b/162b) can connect to at least one conductor. Although the present discussion focuses on using a seven-conductor wireline, the system 50 can use a three-conductor wireline or any other multi-conductor wireline. For the three-conductor wireline, for example, one conductor can be used for carrying analog carrier signals, while the other two conductors are paired to carry the FM carrier signals.

In transmitting the FM carrier signals, the telemetry unit 110 preferably uses carrier frequencies for the paired conductors that are successive multiples of each other. As one example, the frequencies may use a multiple of about 1.25 starting at about 15 kHz, but other configurations can be used. Pairing of opposite conductors and using frequencies of successive multiples improves the system's frequency response, making it steadier and experience less attenuation across longer wireline lengths.

Figure 4:
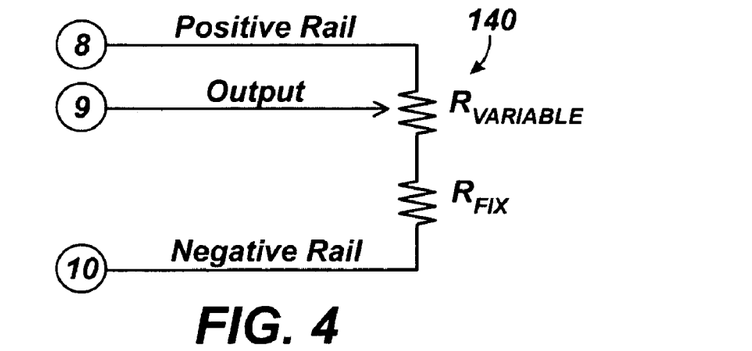
FIG. 4 illustrates an example of a downhole tension circuit for the configuration of FIG. 3.

As also shown in FIG. 3, the tension circuit 140 couples to conductors (8, 9, 10) of the multi-pin cable head 130. A representative schematic of the tension circuit 140 is shown in FIG. 4. A positive rail connects to conductor (8), and a negative rail connects to conductor (10). The output of a variable resistor connects to conductor (9). The tension circuit 140 responds to tension on the wireline 150 by altering the variable resistance as a function of the wireline tension.

As shown in FIG. 3, lines 137 connect from the conductors (8, 9, 10) at the cable head 130 and carry tension signals from the tension circuit 140 to the downhole tool's electronic unit 112. Then, the telemetry unit 110 transmits the tension signals uphole both as FM carrier signals via first conductors (2, 3, 5, 6) and as analog carrier signals via second conductors (1, 4, 7). Transmitting the tension signals as both FM and analog carrier signals enables operators to better perform microseismic hydraulic fracture mapping.

For example, when the tool 100 is deployed downhole and clamped in the borehole 52, the injection of frac fluids in the borehole 52 puts stress on the wireline 150 because the frac fluid typically has a proppant such as sand and is injected at high pump rates. In such a situation, it is possible for the wireline 150 to fail if too much tension is reached. By transmitting the wireline tension uphole, operators can sufficiently monitor the tension during the operation so that pump rates can be modified as needed.

Also, using both analog and FM carrier signals to transmit the tension uphole, operators at the surface can use a conventional surface acquisition system and/or an acquisition system capable of handling FM carrier signals to process the tension signals and monitor tension. This added functionality makes the system 50 more versatile and facilitates the microseismic hydraulic fracture mapping operation by allowing operators to use different acquisition system. For example, operators responsible for deploying the tool 100 and inducing the frac fluids may rely upon a conventional data acquisition system capable of processing analog signals, whereas other operators responsible for processing the microseismicity information may rely on a different data acquisition system capable of handling FM carrier signals as disclosed herein.

In addition to sending tension signals via analog and FM carrier signals, the tool 100 can also transmit gamma ray signals via both carrier signals. For example, before deploying the TABS logging tool 100 in the borehole 52, operators have usually mapped the borehole 52 with a gamma ray detector in a previous operation. When the tool 100 is deployed for the microseismic hydraulic fracture mapping operation, it is useful to be able to correlate the current gamma ray measurements from the deployed tool 100 with the previously mapped gamma ray measurements. Typically, a wireline truck or other system used to deploy the tool 100 is capable of monitoring the depth at which the tool 100 is deployed so that the tool 100 can be lowered to the desired depth for the operation. When the TABS logging tool 100 is deployed and sends gamma ray measurements via analog carrier signals, the tool's current gamma ray measurement can be correlated to the expected gamma ray measurement at the deployed depth of the tool 100 as a way to verify the actual depth of the tool 100. Yet, transmitting the gamma ray measurements via FM carrier signals along with the microseismicity measured the geophones 180A-C via conductors (2, 3, 5, 6) of the wireline 150 during operations allows operators to use a single data acquisition system to directly correlate the tool's gamma ray measurements with the microseismicity measured with the tool's geophones 180A-C. The direct correlation between the gamma ray measurements and the microseismicity can be beneficial in later analysis of the data.

Figure 5:
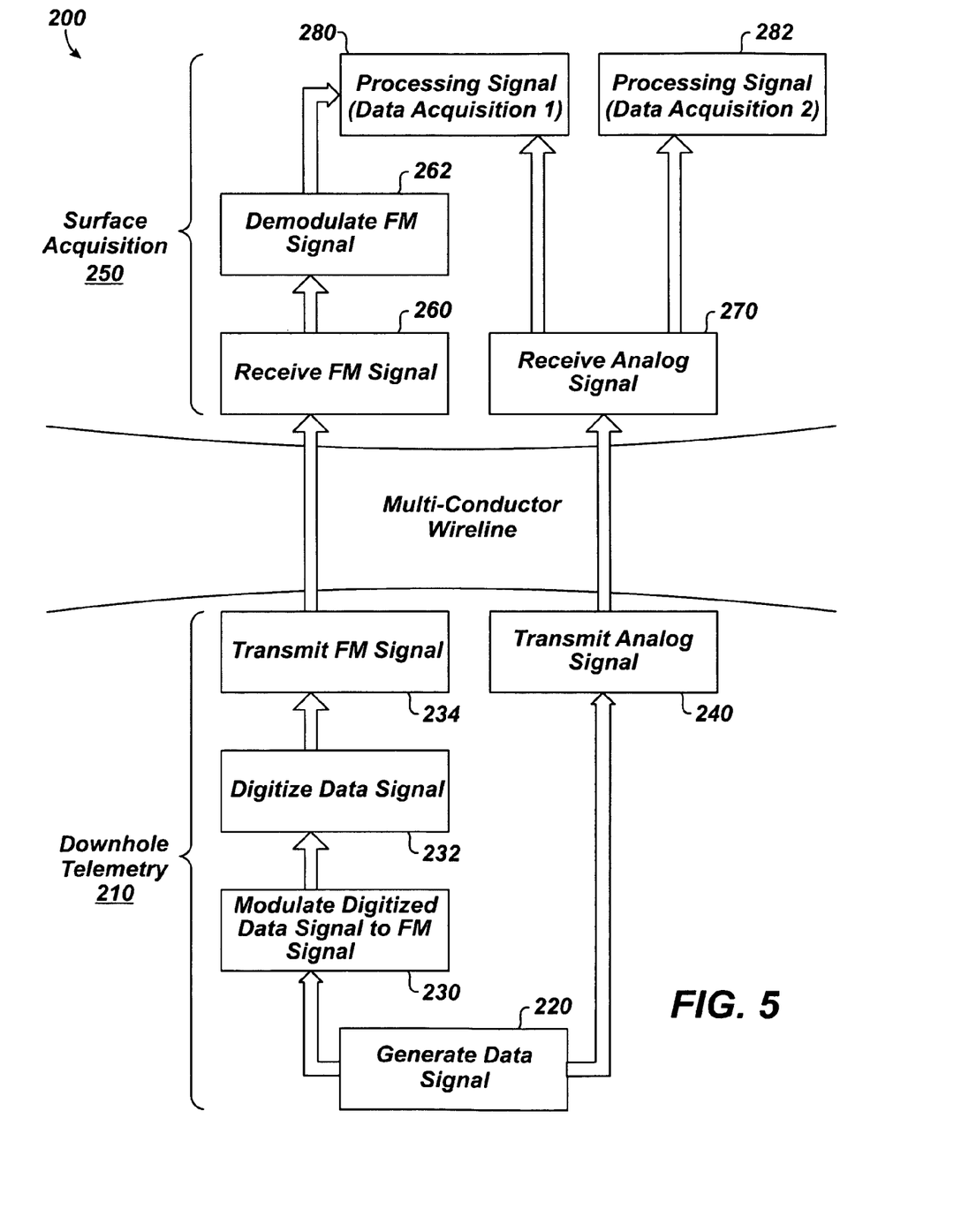
FIG. 5 illustrates a data telemetry scheme for the configuration of FIG. 3 in flow chart form.
Figure 6:
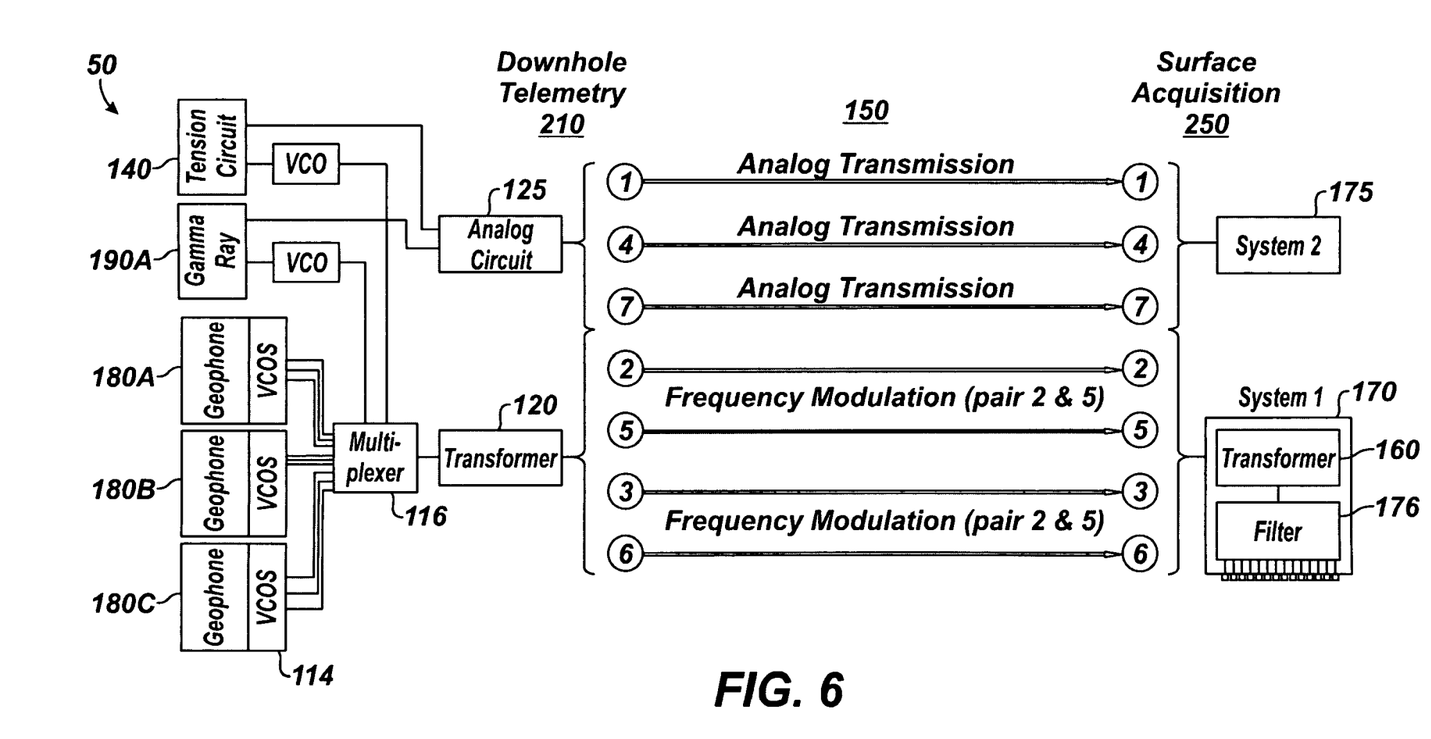
FIG. 6 diagrammatically illustrates the data telemetry scheme of FIG. 5.

With an understanding of the system 50 in FIGS. 2-4, reference is now made to a telemetry scheme as shown in FIGS. 5-6 for operating the system 50. The telemetry scheme has a downhole telemetry stage 210 and a surface acquisition stage 250 as shown in both FIGS. 5 and 6. In the telemetry stage 210, the downhole TABS tool 100 generates data signals by detecting microseismic events, making gamma ray measurements, generating inclinometer and gyroscope's readings, etc. (Block 220). Telemetry of the generated signals then uses either a digital path, an analog path, or both depending on the sensed measurements.

For signals generated by the geophones 180A-C, tension circuit 140, and gamma ray detector 190A, for example, the downhole telemetry unit 110 digitizes the signals (Block 230) and modulates the digitized signals into frequency modulated (FM) carrier signals (Block 232). Then, the downhole telemetry unit 110 mixes or multiplexes these signals into a composite signal and transmits the composite signals uphole via the wireline 150 using the conductor pairs (2 & 5)/(3 & 6) (Block 234).

As shown in more detail in FIG. 6, for example, carrier signals output from the downhole telemetry stage 210 are split between analog carrier signals and FM carrier signals and are received as input at the surface acquisition stage 250 via the wireline 150. This makes the configuration compatible with both analog and digital acquisition systems, thereby increasing the usefulness of the configuration and its signal carrying capabilities.

As discussed previously, first conductors (2, 3, 5, 6) having a first conductor pair (2 & 5) and a second conductor pair (3 & 6) carry the FM carrier signals, while second conductors (1, 4, 7) of the wireline 150 carry analog carrier signals. For the geophones 180A-C, voltage signals from their transducers 184 pass through voltage-controlled oscillators 114 that generate sinusoidal signals with frequencies varying about predetermined center carrier frequencies. Consequently, each of the nine transducers of the geophones 180A-C has a distinct center carrier frequency so the separate signals can be deconvolved at the surface. For one or more of the other sensors, and more particularly the tension circuit 140 and gamma ray detector 190A, voltage signals from these sensors pass through voltage-controlled oscillators 114 that generate sinusoidal signals with frequencies varying about predetermined center carrier frequencies as well.

A multiplexing circuit 116 multiplexes the FM carrier signals from the geophones 180A-C and the other sensors 140 & 190A and passes the multiplexed signals to the telemetry transformer 120 for transmission via conductor pairs (2 & 5) and (3 & 6). In this way, the FM carrier signals using first conductors (2, 3, 5, 6) carry information from the tool's geophones 180A-C and from the tension circuit 140 and gamma ray detector 190A to the surface.

In the surface acquisition stage 250 shown in FIGS. 5 and 6, the surface acquisition system 170 coupled to the wireline 150 receives the composite signal across its transformer 160 (Block 260) and passes the composite signal to a filter 176 and digital signal processor to demodulate the carrier signals and recover their frequencies (Block 262). As illustrated in more detail in FIG. 6, for example, the surface acquisition stage 250 shows the data acquisition system 170 receiving the FM carrier signals with the telemetry transformer 160. A filter 176 (having a frequency selection filter or a plurality of bandpass filters) coupled to the transformer 160 in turn isolates each carrier signal based on its center carrier frequency so that the carrier signals can be demodulated using techniques known in the art.

Ultimately, a first data acquisition process can determine microseismic data from the demodulated signals (Block 280), displaying the data on a computer screen and recording it in memory for later analysis. An acquisition system capable of handling FM carrier signals according to the present disclosure can use technology available from ExxonMobil Upstream Research Company (URC).

In the data telemetry stage 210, the downhole telemetry unit 110 handles signals generated by the tension circuit 140, gamma ray detector 190A, inclinometer (190B), and gyroscope (190C) by transmitting analog signals uphole via the multi-conductor wireline 150 using the conductors (1, 4, 7) (Block 240). As shown more particularly in FIG. 6, for example, the signals from the tension circuit 140 and gamma ray detector 190A also pass to an analog circuit 125 used for amplitude or pulse modulation of analog signals via the wireline 150. Consequently, one or more of the second conductors (1, 4, 7) can also carry the analog carrier signals from the tension circuit 140 and the gamma ray detector 190A to the surface. In this way, the logging system 50 can transmit the same tension and gamma ray information as input to the surface acquisition stage 250 using both the FM carrier signals and the analog carrier signals so that the downhole tool 100 can be used with any surface data acquisition system.

In general, the analog circuit 125 can operate according to customary analog telemetry techniques. For example, the analog circuit 125 can receive direct current (DC) from the surface via conductors (1, 4, 7) and can return amplitude or pulse modulated signals to the surface acquisition input 250. The analog circuit 125 can also transmit analog carrier signals from the inclinometer unit 190B and the gyroscope 190C of FIG. 2 so the analog conductors (1, 4, 7) in the wireline 150 can carry downhole tension signals, gamma ray signals, inclinometer signals, gyroscope signals, etc.

In the surface acquisition stage 250, the surface acquisition system 170 coupled to the wireline 150 receives the analog carrier signals (Block 270), and a second data acquisition system processes the analog signals (Block 282). As shown in FIG. 6, a second conventional system 175 receives the analog carrier signals from the wireline 150 and processes them according to techniques known in the art. An example of a conventional data acquisition system includes the CS400® Data Acquisition System available from Weatherford International, Ltd.

As seen by the above telemetry scheme, the carrier signals are split before digitizing so that analog signals can be transmitted to the surface via those conductors not dedicated for FM carrier signals and so digitized signals can be transmitted via those conductors dedicated for FM carrier signals. The number of signals that can be transmitted to the surface without being digitized is dependent upon the number of wireline conductors that are not assigned for the digital signal. Slowly varying parameters can be captured and transmitted to the surface digitally using a 24-bit A-to-D converter and multiple channels can be scanned sequentially for an increased update rate of samples per second.

Figure 7:
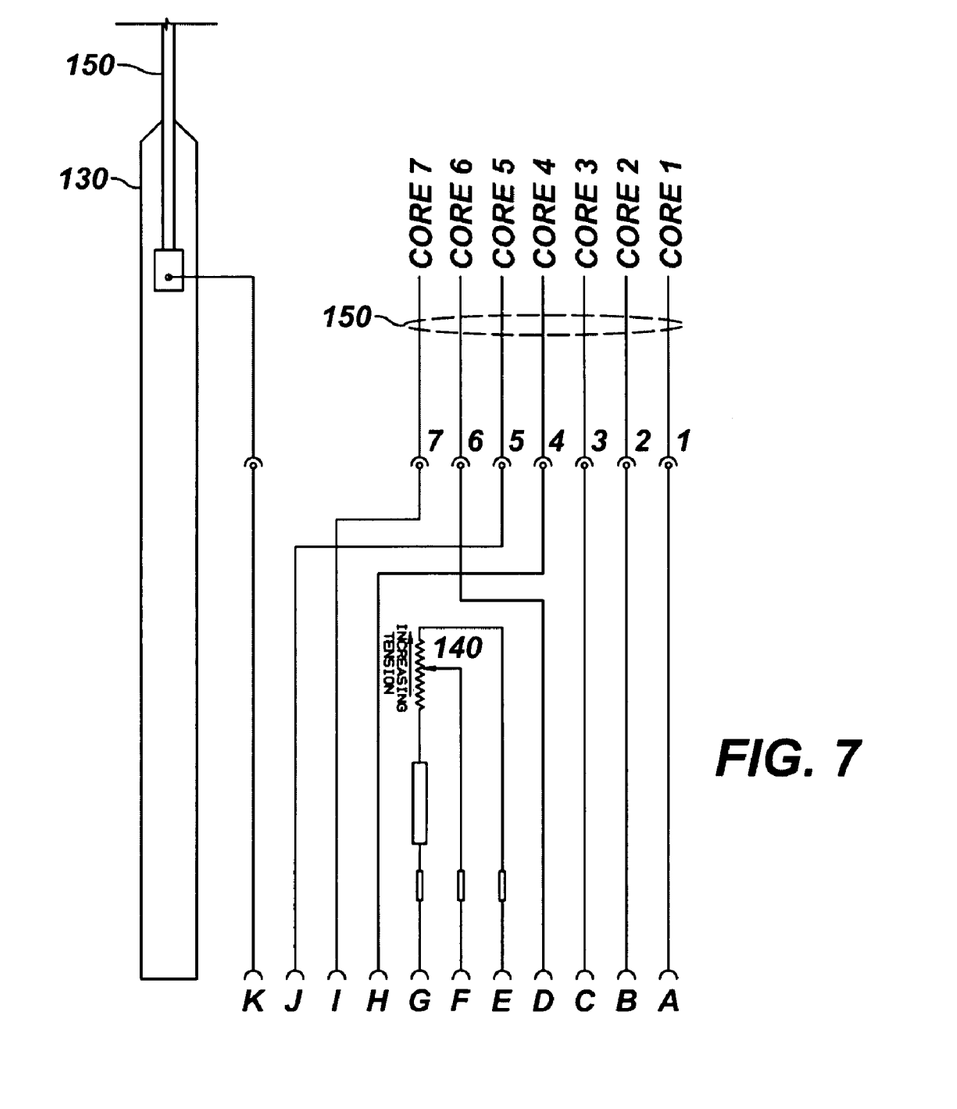
FIG. 7 illustrates a preferred cable head for the system of FIG. 2.

As noted above, the system 50 in FIG. 2 uses a cable head 130 to couple the wireline 150 to the tool 100 and uses a tension circuit 140 to measure the wireline tension. FIG. 7 shows a schematic of a preferred cable head 130 for use with the disclosed system. This cable head 130 has an integrated tension circuit 140 and can be similar to an 11-way cable head available from Reeves Technologies.

The wireline 150 couples to one end of the cable head 130, and the seven core conductors (1-7) of the wireline 150 connect to wiring in the head 130. Internally, the head 130 has eleven lead connections (A-K). These lead connections (A-K) connect to internal leads of the downhole tool (100; FIG. 2) communicatively coupled to the telemetry unit (110; FIG. 2), for example. Lead connections (A, B, C, H, J, D, I) respectively couple to conductors (1-7). Thus, lead connections (B, C, J, D) communicatively couple to the terminals of the telemetry unit's transformer (120; FIG. 3) and carry the FM carrier signals discussed previously for the geophones, tension circuit, and gamma ray detector. Lead connections (A, H, I) communicatively couple to the telemetry unit (110) and can carry the analog carrier signals discussed previously for the other sensor units of the tool.

Lead connections (E & G) include the positive and negative rails of the tension circuit 140, and the lead connection (F) is the output of this circuit 140. These lead connections (E, F, G) communicatively couple to the electronic unit (112; FIG. 3) as discussed previously for transmitting the tension signals via analog and FM carrier signals to the surface with the telemetry unit (110). Lead connection (K) is used for other purposes, such as grounding the cable head's armature.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A downhole data telemetry method, comprising:
   deploying a logging tool downhole with a wireline, the logging tool having a plurality of seismic sensors and having at least one second sensor;
   generating first signals with the seismic sensors;
   generating second signals with the at least one second sensor;
   deriving frequency-modulated carrier signals from both the first and second signals;
   transmitting the frequency-modulated carrier signals from a first telemetry output to the surface via first conductors of the wireline;
   deriving analog carrier signals from the second signals; and
   transmitting the analog carrier signals from a second telemetry output to the surface via at least one second conductor of the wireline.

2. The method of claim 1, further comprising:
   receiving the frequency-modulated carrier signals at a first telemetry input at the surface; and
   recovering both the first and second signals by demodulating the frequency-modulated carrier signals.

3. The method of claim 2, further comprising:
   receiving the analog carrier signals at a second telemetry input at the surface; and
   recovering the second signals from the analog carrier signal.

4. The method of claim 3, wherein the first telemetry input is part of a first data acquisition system, and wherein the second telemetry input is part of a second data acquisition system different from the first data acquisition system.

5. The method of claim 1, wherein deriving the frequency-modulated carrier signals comprises:
   digitizing the first and second signals;
   modulating the digitized signals into the frequency-modulated carrier signals; and
   multiplexing the frequency-modulated carrier signals into the first conductors of the wireline.

6. The method of claim 1, wherein the first signals are generated in response to microseismic events downhole.

7. The method of claim 1, wherein the at least one second sensor is selected from the group consisting of a tension circuit measuring wireline tension, a gamma ray sensor, an inclinometer, a gyroscope, and a casing collar locator.

8. The method of claim 1, wherein the first conductors comprise a cross-wise pair of conductors disposed on opposing sides of a center of the wireline and comprise at least one other conductor of the wireline.

9. The method of claim 8, wherein the at least one other conductor comprises another cross-wise pair of conductors disposed on opposing sides of the center of the wireline, and wherein the at least one second conductor comprises any remaining conductors of the wireline.

10. The method of claim 8, wherein the first telemetry output comprises first and second terminals of a transformer, and wherein the method comprises connecting the cross-wise pair of conductors to the first terminal, and connecting the at least one other conductor to the second terminal.

11. The method of claim 8, wherein the first telemetry input comprises first and second terminals of a transformer, and wherein the method comprises connecting the cross-wise pair of conductors to the first terminal, and connecting the at least one other conductor to the second terminal.

12. The method of claim 1, wherein the at least one second sensor includes a tension circuit being responsive to tension between the logging tool and the wireline, and wherein the method further comprises:
connecting the wireline to the logging tool using a cable head having the tension circuit;
generating a tension signal with the tension circuit responsive to tension between the logging tool and the wireline; and
communicating the tension signal from the cable head to the logging tool for transmission to the surface via the wireline.

13. The method of claim 12, wherein communicating the tension signal from the cable head to the logging tool comprises:
connecting a positive rail, a negative rail, and an output of the tension circuit via leads between the logging tool and the cable head, the output having a variable resistance between the positive and negative rails that varies based on tension of the wireline.

14. The method of claim 13, wherein the tension signal is transmitted to the surface by:
deriving a frequency-modulated carrier signal from the tension signal;
transmitting the frequency-modulated carrier signal from the first telemetry output to the surface via the first conductors;
deriving an analog carrier signal from the tension signal; and
transmitting the analog carrier signal from the second telemetry output to the surface via the at least one second conductor.

15. The method of claim 1, wherein the at least one second sensor includes a gamma ray detector being responsive to gamma ray energy and generating a gamma ray signal in response thereto, and wherein the gamma ray signal is transmitted to the surface by:
deriving a frequency-modulated carrier signal from the gamma ray signal;
transmitting the frequency-modulated carrier signal from the first telemetry output to the surface via the first conductors;
deriving an analog carrier signal from the gamma ray signal; and
transmitting the analog carrier signal from the second telemetry output to the surface via the at least one second conductor.

16. A wireline deployable telemetry apparatus, comprising:
an electronic unit communicatively coupled to a plurality of seismic sensors and at least one second sensor of a downhole tool, the electronic unit deriving frequency-modulated carrier signals from first signals generated by the seismic sensors and from second signals generated by the at least one second sensor, the electronic unit deriving analog carrier signals from the second signals generated by the at least one second sensor; and
a telemetry unit communicatively coupled to the electronic unit and the wireline, the first telemetry unit transmitting the frequency-modulated carrier signals from a first telemetry output to the surface via first conductors of the wireline, the telemetry unit transmitting the analog carrier signals from a second telemetry output to the surface via at least one second conductor of the wireline.

17. A wireline deployable logging apparatus, comprising:
a plurality of seismic sensors disposed on the logging apparatus and configured to generate first signals;
at least one second sensor disposed on the logging apparatus and configured to generate second signals;
an electronic unit disposed on the logging apparatus and communicatively coupled to the seismic sensors and to the at least one second sensor, the electronic unit deriving frequency-modulated carrier signals from the first and second signals and deriving analog carrier signals from the second signals; and
a first telemetry unit disposed on the logging apparatus and communicatively coupled to the electronic unit and the wireline, the first telemetry unit transmitting the frequency-modulated carrier signals from a first telemetry output to the surface via first conductors of the wireline, the telemetry unit transmitting the analog carrier signals from a second telemetry output to the surface via at least one second conductor of the wireline.

18. The apparatus of claim 17, further comprising:
a second telemetry unit communicatively coupled to the wireline and receiving the frequency-modulated carrier signals; and
a first data acquisition system communicatively coupled to the second telemetry unit and demodulating the frequency-modulated carrier signals to recover the first and second signals.

19. The apparatus of claim 18, wherein the second telemetry unit receives the analog carrier signals, and wherein a second data acquisition system recovers the second signals from the analog carrier signals.

20. The apparatus of claim 19, wherein the second data acquisition system is different from the first data acquisition system.

21. The apparatus of claim 17, wherein to derive the frequency-modulated carrier signals, the electronic unit digitizes the first and second signals and modulates the digitized signals into the frequency-modulated carrier signal for multiplexing into the first conductors of the wireline.

22. The apparatus of claim 17, wherein the seismic sensors are responsive to microseismic events downhole.

23. The apparatus of claim 22, wherein the at least one second sensor is selected from the group consisting of a wireline tension measuring circuit, a gamma ray sensor, an inclinometer, a gyroscope, and a casing collar locator.

24. The apparatus of claim 17, wherein the first conductors comprise a cross-wise pair of conductors disposed on opposing sides of a center of the wireline and comprise at least one other conductor of the wireline.

25. The apparatus of claim 24, wherein the at least one other conductor comprises another cross-wise pair of conductors disposed on opposing sides of the center of the wireline, and wherein the at least one second conductor comprises any remaining conductors of the wireline.

26. The apparatus of claim 24, wherein the first telemetry unit comprises a first transformer having first and second terminals, the cross-wise pair of conductors connected to the first terminal, the at least one other conductor connected to the second terminal.

27. The apparatus of claim 26, further comprising a second transformer receiving the frequency-modulated carrier signal, the second transforming having a first terminal connected to the cross-wise pair of conductors and having a second terminal connected to the at least one other conductor.

28. The apparatus of claim 17, wherein the at least one second sensor includes a tension circuit, and wherein the apparatus further comprises a cable head connected between the logging apparatus and the wireline and having the tension circuit, the tension circuit having being responsive to tension of the wireline.

29. The apparatus of claim 28, wherein the tension circuit comprises a positive rail, a negative rail, and an output coupled to the electronic unit, the output having a variable resistance between the positive and negative rails that varies based on the tension of the wireline.

30. The apparatus of claim 28, wherein
the electronic unit receives a tension signal from the tension circuit and derives a frequency-modulated carrier signal and an analog carrier signal from the tension signal, and
the first telemetry unit transmits the frequency-modulated carrier signal to the surface via the first conductors and transmits the analog carrier signal to the surface via the at least one second conductor.

31. The apparatus of claim 17, wherein
the at least one second sensor includes a gamma ray detector being responsive to gamma ray energy and generating a gamma ray signal in response thereto,
the electronic unit receives the gamma ray signal from the gamma ray detector and derives a frequency-modulated carrier signal and an analog carrier signal from the gamma ray signal, and
the first telemetry unit transmits the frequency-modulated carrier signal to the surface via the first conductors and transmits the analog carrier signal to the surface via the at least one second conductor.

* * * * *